Patented Oct. 22, 1946

2,409,806

UNITED STATES PATENT OFFICE 2,409,806

SYNTHESIS OF NICOTINIC COMPOUNDS

William Shive, Urbana, Ill., and Richard A. Glenn, Mount Lebanon, Pa., assignors to Pittsburgh Coke & Chemical Company, a corporation of Pennsylvania No Drawing. Application December 8, 1941, Serial No. 422,187

5 Claims. (Cl. 260—296)

This invention relates to the synthesis of nicotinic compounds; and it comprises a method of producing nicotinic compounds, such as nicotinic acid and nicotinamide, directly from pyridine, wherein pure pyridine is converted into substantially pure pyridine-3-sulfonic acid (also called beta-pyridine sulfonic acid) advantageously by sulfonating with sulfur trioxide in a system substantially free of water or sulfuric acid and in the presence of mercury as a catalyst, a pyridine-3-sulfonate being then isolated and converted into the nitrile of nicotinic acid (3-cyanopyridine or beta-cyanopyridine) with a cyanide, and the nitrile being hydrolyzed to furnish pure nicotinamide or nicotinic acid; all as more fully hereinafter set forth and as claimed.

Nicotinic acid is an essential, albeit an infinitesimal, constituent of food. It forms part of the vitamin B complex and is itself considered a specific in various forms of pellagra. A large commercial demand has arisen for it for fortifying cereal foods. For this purpose the nicotinic acid must be not only chemically pure but biologically pure; that is, free from any substances having undesired effects on the human body. The presence of physiologically active impurities cannot be tolerated. Unfortunately, there is no food sufficiently rich in nicotinic acid to warrant its extraction therefrom as a commercial proposition.

Nicotineamide is generally similar to nicotinic acid in its physiological reactions and uses, but is sometimes more desirable in that, even in similar doses, it does not give the allergic reaction sometimes produced by nicotinic acid.

Nicotinic acid is pyridine carrying a carboxyl radical in the 3- or beta-position. Nicotineamide is the acid amide of this acid. As an academic proposition, the acid can be made by oxidizing any pyridine derivative carrying a single substituent in the beta- or 3-position, provided that the carbon in the 3- or beta-position is linked directly to a carbon in the substituent. Unfortunately, again, there are few commercial materials having this structure which are available in sufficient purity to warrant their direct use. Oxidation of any other than a 3- or beta-side chain does not give nicotinic acid, and does give impurities that are not wanted.

An object achieved in the present invention is the provision of a method of producing pure nicotinic acid or pure nicotinamide, using pyridine itself, free from any other pyridine compound, as a source material. There are ample supplies of pure pyridine available, and it can be converted into nicotinic acid by attaching a carboxyl in the 3-position. This is done in the present invention.

In the present invention, pyridine is first sulfonated. We have found that sulfonation of pyridine may be practically confined to the 3-position by sulfonating with sulfur trioxide in the absence of sulfuric acid, with mercury as a catalyst. The temperatures required are not high, ranging from 170° to 300° C., and good sulfonation can be effected in, say, 3 to 6 hours. The best yields, such as 90 per cent or more, are generally obtained when operating at temperatures above 200° C., and with a substantial excess of $SO_3$, such as 1.5 mols $SO_3$ per mol of pyridine. Ratios from 1.2 to 1.8 mols $SO_3$ per mol of pyridine give good results. When the sulfonation reaction is completed, the excess $SO_3$ is removed, as by precipitation with calcium carbonate or barium carbonate, and the calcium or barium salt of beta-pyridine sulfonic acid is recovered from the solution. This sulfonate is then converted into the nitrile of nicotinic acid, 3-cyanopyridine, by direct treatment with a cyanide, or advantageously by conversion into an alkali metal sulfonate which is then treated with the cyanide. In either case, the 3-cyanopyridine obtained is readily hydrolyzed to obtain pure nicotinamide or nicotinic acid. Operating in this manner, with pure pyridine as the starting material, is easier and better than working with other materials and attempting to remove the impurities afterwards.

In the sulfonation treatment, mercury and its compounds, especially the sulfate, are the best catalysts. Mercury can be removed from the reaction products as the sulfide, if desired, and the recovered sulfide can be added directly to the sulfur trioxide of a new batch to serve as the catalyst.

In the present method, pyridine is sulfonated practically exclusively in the 3-position and the reaction mixture is freed from excess ($SO_3$) and neutralized with lime, calcium carbonate, barium carbonate, or baryta, as noted. The solution of barium or calcium pyridine sulfonate thus obtained may be treated with $H_2S$ or sodium sulfide to get rid of the mercury catalyst. It is not necessary to remove the catalyst, but it may be precipitated for recovery and reuse, if desired. The calcium or barium pyridine sulfonate is then reacted with sodium or potassium carbonate or sulfate, if desired, to convert the alkaline earth compound to an alkali metal sulfonate. The dry pyridine-3-sulfonate of alkali or alkaline earth metal is recovered, and is mixed with sodium or potassium cyanide, or advantageously a mixture of the two, and heated so as to give a progressive, rather slow evolution of 3-cyanopyridine, which comes off as a vapor and is condensed. We have found that the rapid removal of 3-cyanopyridine as it is formed increases the yield. Prompt removal of 3-cyanopyridine may be effected by operating under reduced pressure, or by the use of a stream of inert gas, such as nitrogen, or both. Quick removal is particularly useful in the later stages of the reaction. Better yields are obtained by not carrying the temperature of the mixture of the pyridine-3-sulfonate and the cyanide or cyanide mixture to such a point as to effect complete fusion. We have found 340° to 380° C. a satisfactory temperature range. Such precautions lessen or avoid the formation of resinous products, which result in lowered yields.

In a specific embodiment of this invention, 100 parts by weight of sulfur trioxide and 1.8 parts by weight of mercuric sulfate were placed in a reaction vessel and 60 parts by weight of pure anhydrous pyridine were added slowly to the vessel during one hour. During the addition of the pyridine, the vessel and its contents were cooled from time to time, since the reaction developed a great deal of heat. Such cooling is not usually necessary when the temperatures do not exceed 250° C. After the pyridine addition was complete, the mixture was heated for 6 hours under reflux at about 230° C., care being taken to avoid the entry of atmospheric moisture into the system. Upon cooling the reaction mixture, a thick viscous liquid was obtained, which was poured into 2000 parts by weight of water and neutralized with barium carbonate. The excess $SO_3$, converted to $H_2SO_4$ by dilution with water as above described, was thus converted to an insoluble salt and was removed by filtration. The soluble barium pyridine-3-sulfonate was decolorized with decolorizing carbon, although this is not a necessary part of the process. Mercury can now be removed by precipitating it as the sulfide, using $H_2S$ or NaHS as a reagent, and filtering to recover the HgS, which is then added to a fresh batch. The filtrate was then evaporated to dryness. A yield of barium salt of pyridine-3-sulfonic acid amounting to 90 per cent of theoretical was thus obtained.

In other specific operations using similar proportions of reagents, a yield of 75 per cent was obtained by heating for 9 hours at 200°; a yield of 96 per cent was obtained by heating for 6 hours at 225° C.; a yield of nearly 100 per cent was obtained by heating for 5 hours at 230° C.; and a yield of 90 per cent was obtained by heating for 6 hours at 250–260° C. These and other runs indicate that the optimum temperature for this sulfonation is about 225° to 235° C.

A mixture of 40 parts by weight of barium pyridine-3-sulfonate, prepared as described and 11 parts by weight of potassium cyanide, was heated slowly at atmospheric pressure to incipient fusion in a still, and heating was continued until no more volatile material was produced, even on strong heating. The distillate, 3-cyanopyridine, was condensed and collected and dissolved in ether, and the ether solution was washed with dilute caustic soda solution. The caustic solution was then separated and the ether solution was washed and dried. The solvent was distilled off, leaving the solid nitrile or 3-cyanopyridine. This was recrystallized from petroleum ether, yielding 5 parts by weight of pure beta-cyanopyridine, M. P. 48° C. Higher proportions of cyanide in the reaction mixture increase the yield of 3-cyanopyridine.

The 3-cyanopyridine prepared as above was hydrolyzed to nicotinic acid by using concentrated hydrochloric acid, refluxing for 12 hours. The 3-cyanopyridine was thus converted with an almost theoretical yield (95 per cent) to nicotinic acid hydrochloride. The hydrochloride was freed from excess hydrochloric acid by evaporating to dryness. The crude nicotinic acid was separated from the dried mass by adding approximately 2 mols sodium acetate per mol of nicotinic acid and then adding sufficient water to effect solution at about 90° C. On cooling and standing, crude nicotinic acid separated and was removed by filtration.

The nicotinic acid was purified by two recrystallizations from water; that is, by adding sufficient boiling water to effect solution at approximately 90° C. and cooling the batch to about 5° C. The nicotinic acid was removed by filtration and the above process repeated. By this method an 85 per cent theoretical yield, on the 3-cyanopyridine, of pure nicotinic acid (having a melting point of 236 to 236.5° C.) was obtained. An increased yield was obtained by reworking the mother liquor obtained above.

In a further specific embodiment, barium-pyridine-3-sulfonate prepared as described above, was converted to the sodium salt by treating with sodium sulfate. With 50 parts by weight of this sodium salt in finely powdered form were mixed 25 parts by weight of sodium cyanide and 25 parts by weight of potassium cyanide. The mixture was heated slowly at a rate and at a temperature sufficient to produce a steady evolution of volatile material (which was condensed and collected) but insufficient to produce white clouds, which characterize overheating. The latter stage of the heating was carried out under reduced pressure to assist in removing the 3-cyanopyridine. The distillate was purified in a conventional manner to yield 13 parts by weight of 3-cyanopyridine, a yield of 45 per cent of theoretical, based on the sodium pyridine-3-sulfonate. This nitrile was then hydrolyzed in the conventional manner to nicotinic acid.

In another specific embodiment of the invention, illustrating the production of nicotinamide, 10 parts of 3-cyanopyridine produced as described hereinabove were dissolved in 72 parts of concentrated sulfuric acid and allowed to stand for 12 to 15 hours. The reaction mixture was then poured into about 200 parts of water, and the sulfuric acid was neutralized with excess ammonium hydroxide. The resulting basic mixture was extracted several times with ether. The ether solution was concentrated by evaporation and allowed to stand for a time, whereupon one part of nicotinamide crystallized out. The melting point of the crude amide was 120° C.

In a further embodiment, 10 parts of 3-cyanopyridine were dissolved in 36 parts of cold sulfuric acid and the mixture was allowed to stand for 16 hours at room temperature. The reaction mixture was poured into 250 parts of ice water, and rendered basic by adding excess ammonium hydroxide. The basic solution was then heated to about 70° C., and extracted several times with benzene. Evaporation of the benzene yielded one part of nicotinamide.

In the foregoing examples, "parts" are parts by weight, unless otherwise indicated. The nicotinamide obtained is highly useful therapeutically, as previously noted, but may be readily hydrolyzed into nicotinic acid if desired, since it is a product of the partial hydrolysis of 3-cyanopyridine.

By the term "free of H₂O" or "in the substantial absence of H₂O" as used in the claims, we mean free from H₂O as such or combined with SO₃ in the form of H₂SO₄.

What we claim is:

1. The process of producing 3 cyano pyridine by heating a mixture of potassium cyanide and sodium cyanide with a pyridine sulfonic acid salt of the following formula

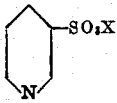

X being selected from the group consisting of alkali metals and alkaline earth metals and recovering the 3 cyano pyridine thus formed.

2. The process according to claim 1 wherein the mixture is heated at a temperature of 340° to 380° C.

3. The process according to claim 1 wherein X is calcium.

4. The process according to claim 1 wherein X is sodium.

5. The process according to claim 1 wherein X is potassium.

WILLIAM SHIVE.
RICHARD A. GLENN.